United States Patent

Inciong

Patent Number: 5,687,975
Date of Patent: Nov. 18, 1997

[54] SEALING ASSEMBLY EMPLOYING OPPOSITELY DIRECTED WEDGES AND COMPLEMENTARY RECESSES

[75] Inventor: Joe Inciong, Skokie, Ill.

[73] Assignee: Fel-Pro Incorporated, Skokie, Ill.

[21] Appl. No.: 701,806

[22] Filed: Aug. 21, 1996

[51] Int. Cl.$^6$ ............................................. F16J 9/00
[52] U.S. Cl. ............................. 277/167.5; 277/235 B
[58] Field of Search ........................ 277/235 B, 167.5, 277/178, 206 A, 211, 207 A, 168, 189, 190

[56] References Cited

U.S. PATENT DOCUMENTS

| | | | |
|---|---|---|---|
| 2,764,311 | 9/1956 | Blackman | 277/167.5 |
| 2,815,549 | 12/1957 | Olson | 277/167.5 |
| 4,260,168 | 4/1981 | Berg | 277/167.5 |
| 4,501,432 | 2/1985 | Kuniyoshi et al. | 277/235 B |
| 4,819,953 | 4/1989 | Joh | 277/235 B |
| 5,221,097 | 6/1993 | Ishikawa et al. | 277/235 B |
| 5,431,417 | 7/1995 | Dahlgren | 277/167.5 |

*Primary Examiner*—Daniel G. DePumpo
*Attorney, Agent, or Firm*—Laff, Whitesel, Conte & Saret, Ltd.

[57] ABSTRACT

A sealing assembly for sealing a valve cover and a head, including an elastomeric gasket with a pair of oppositely directed wedges sealing in complementary wedge-shaped recesses in the valve cover flange and head and having a complementary wedged-shaped configuration, and a barrier strip in the gasket extending into each of the oppositely directed wedges to effect a seal internally of the gasket and to prevent flow of fluid through the gasket.

5 Claims, 2 Drawing Sheets

SEALING ASSEMBLY EMPLOYING OPPOSITELY DIRECTED WEDGES AND COMPLEMENTARY RECESSES

BACKGROUND OF THE INVENTION

In a wide variety of sealing applications, a plurality of spaced bolts are used to clamp a gasket between a pair of sealing flanges. Because the greatest loads applied are at the locations of the bolts, the gaskets and flanges must be designed to compatible parameters to provide an effectively sealed joint.

In some environments, the lack of stiffness of one or both of the sealing flanges militates against wide spacing of the clamping bolts. For this and other reasons, even special gasket cross-sections and sealing bead arrangements may not be adequate to reduce the number of bolts to a desired minimum. Additionally, gaskets must be designed so that the rubber cross-sections meet the stiffness requirements of the associated flanges. Furthermore, in many gasket applications, the gasket cross-sections become tall and narrow. This can sometimes result in permeation problems that cause premature failure. This may occur due to the nature of the elastomer used for the gasketing material. It may also occur because of the nature of the material to be sealed. For example, silicone elastomers tend to be more permeable than some other elastomers, and natural gas and gasoline tend to permeate rubbers more easily than does motor oil.

It would be desirable therefore, to provide an improved gasket for providing an effective seal between a pair of flanges, which minimizes the number of clamping bolts which must be used, and which prevents leakage of fluid through the gasket. Such desiderata are useful in a variety of applications, such as in valve cover and oil pan gaskets and in other automotive gaskets, as well as in gaskets used in sealing applications for natural gas, gasoline, coolants, among others.

SUMMARY OF THE INVENTION

In accordance with the present invention an improved sealing assembly for sealing a pair of flanges together against the passage of liquid therepast is provided, the sealing assembly comprising a pair of flanges and an elastomeric gasket comprising a gasket body, the gasket body defining an integral first wedge extending outwardly from the gasket body in a first direction and an integral second wedge in line with the first wedge and extending outwardly from the gasket body in the opposite direction, each wedge defining an inclined surface extending at an angle of at least about five degrees from its base, one of the flanges defining a first recess complementary to the first wedge and the other of the flanges defining a second recess complementary to the second wedge, each of the recesses having an inclined surface extending at an angle of at least about five degrees from its base, and means for clamping the flanges and the gasket to force the wedge inclined surfaces into sealing engagement with the confronting inclined surfaces of the recess.

In a preferred form, the gasket body embeds a barrier strip, the barrier strip extending into each of the first and second wedges. The barrier strip effects a seal internally of the gasket to prevent the flow of fluid through the gasket. In one application, the flanges comprise a valve cover flange and a head flange and the clamping means comprises a single clamping stud. Desirably each of the wedges and the recesses defines pairs of complementary inclined surfaces.

Further objects, features and advantages of the present invention will become apparent from the following description and drawings.

DETAILED DESCRIPTION

Figure 1:
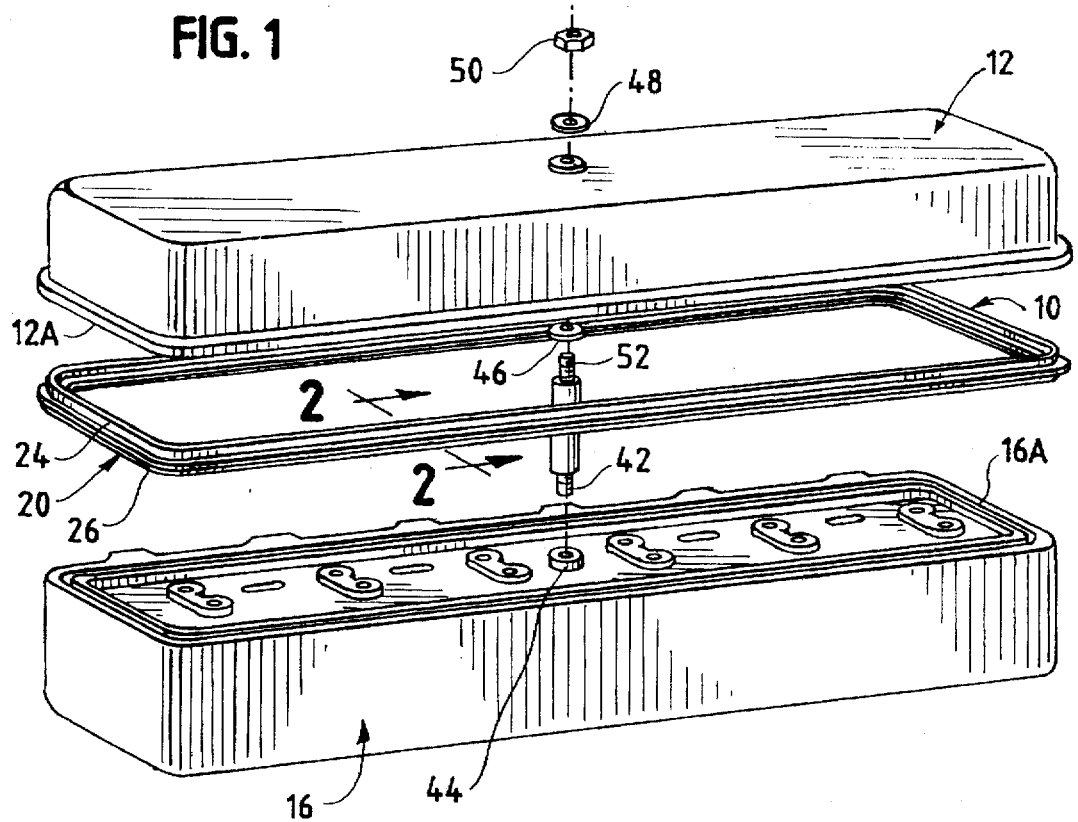
FIG. 1 is a schematic exploded perspective view of a typical engine head, valve cover and valve cover gasket forming a representative sealing assembly in accordance with the present invention.

Referring now to the drawings, a sealing assembly in accordance with the present invention may comprise a gasket 10 for sealing a valve cover 12 to an engine head 16. The valve cover 12 and engine head 16 may be secured by a single clamping stud 40, while still providing an effective seal between the sealing flanges 12A, 16A around the perimeter of the head 16 and cover 12.

Figure 2:
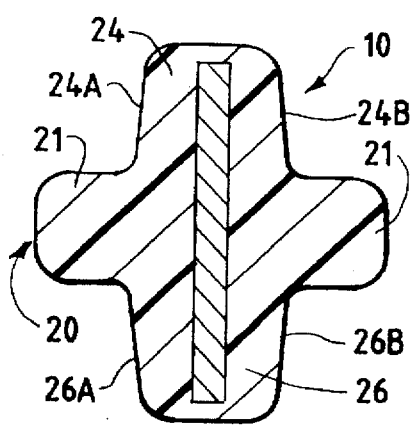
FIG. 2 is a cross-sectional view taken substantially along line 2—2 of FIG. 1.
Figure 3:
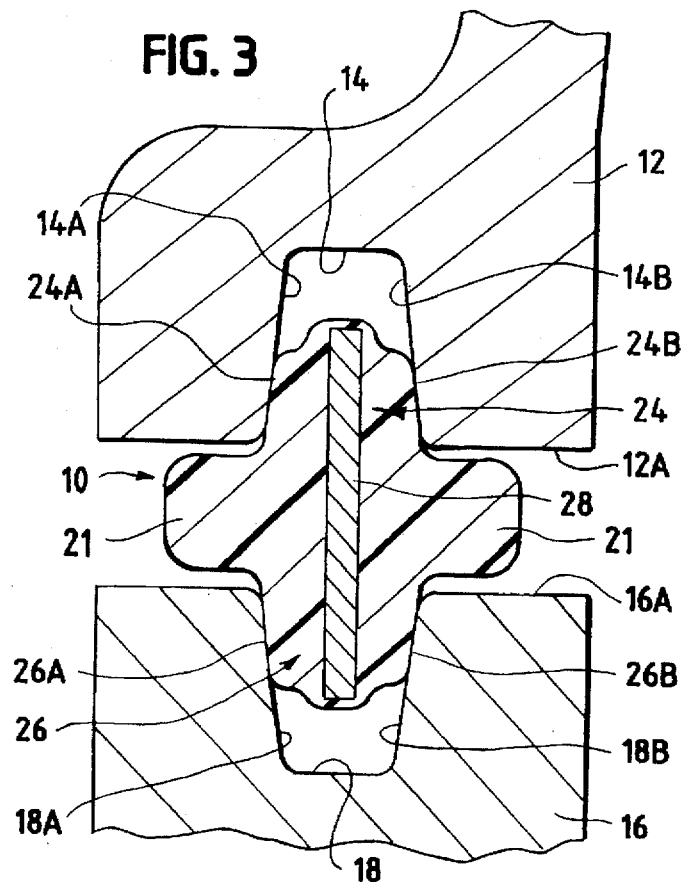
FIG. 3 is a cross-sectional view of the elements of FIG. 1 in a clamped together array and taken in the same location as the section of FIG. 2.

As best seen in FIGS. 1–3, gasket 10 comprises an elastomeric body 20. Body 20 may be of a suitable elastomer, such as a silicone or fluorosilicone rubber. Other suitable elastomers for related applications include elastomers such as nitrile rubber and fluorocarbon rubbers, and acrylic elastomers, among others.

Body 20 also defines a pair of integrally formed tapering wedges 24, 26, one at the top and one at the bottom of the gasket. Each has at least one inclined surface which extends at an angle of at least about five degrees to the vertical from its base. In the illustrated embodiment, each tapering wedge has two such inclined surfaces 24A, 24B and 26A, 26B for purposes to be described.

Gasket body 20 also embeds a continuous barrier 28. Barrier 28 may be a flat strip of sheet metal or may be a flat ribbon of plastic, such as of nylon. Barrier 28 is impervious to the passage of liquids such as oil.

In one form, a gasket 10 may be approximately twenty× seven inches in plan view. In cross-sectional view, as illustrated by FIG. 2, the gasket may be 0.41 inch wide and 0.445 inch high. The barrier may be 0.405 inch high. The lateral beads 21 may be 0.125 inch thick. At their free ends (at the elevation of the ends of the barrier 28) the wedges 24 and 26 are 0.153 inch wide. At their bases or roots, the wedges are 0.173 inch wide. The angles of inclination of the wedge sides is about five degrees.

As shown by FIG. 1, gasket 10 is continuous along the entire perimeter of the confronting sealing flanges 12A, 16A of valve cover 12 and engine head 16 and effects a seal therebetween along that perimeter. The load for clamping the flanges of valve cover 12 and head 14 may be provided by a single centrally located stud 40. Stud 40 has a lower threaded end 42 which is threadingly received in a complementarily threaded opening 44 in the head. The stud 40 is screwed into opening 44 until the stud has been torqued down to a predetermined load. An isolator ring 46 and a top isolator grommet 48 are desirably provided to miinimize noise and to prevent the transmission of vibrations to the cover, as well as to effectively maintain the clamping load. A nut 50 may be used to clamp the entire assembly via its threaded engagement with the upper threaded end 52 of stud 40.

When the nut 50 and stud 40 have been torqued to achieve the desired clamping load, the gasket 10 will provide a sealing force between the valve cover flange 12A and head flange 16A which is effective to prevent the escape of liquid from the enclosed space under the valve cover 12.

To that end, the inclined surfaces 24A, 24B, 26A and 26B will be forced into sealing engagement within the complementary tapered recesses 14 in the valve cover 12 and recesses 18 in the head 16. Recesses 14 and 18 define inclined surfaces 14A, 14B and 18A, 18B which are complementary to the inclined surfaces 24A, 24B, 26A and 26C of the wedges 24, 26. As the wedges are driven into the recesses (as the clamping load is applied by stud 40 and nut 50), highly effective seals are created at the inclined wedge and recess interfaces. Preferably the dimensions are such that the lateral beads 21 of the gasket 10 will not bottom out against the flanges so that the seals effected are completely between the wedges and the recesses.

Figure 4:
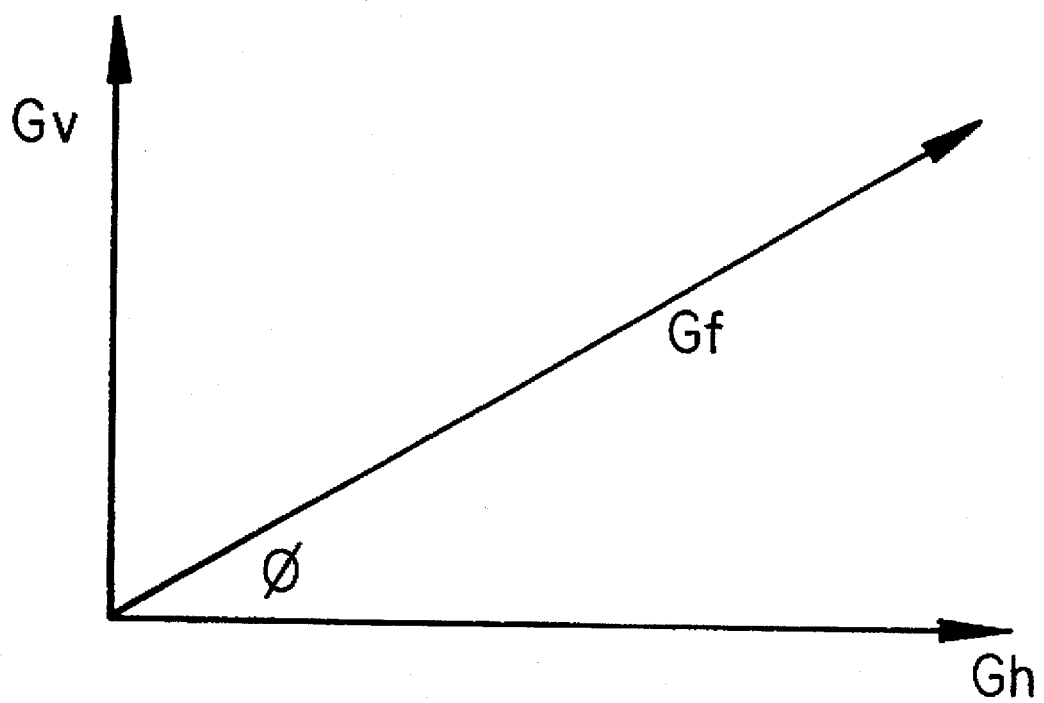
FIG. 4 is a graphical depiction of the effect of the bolt clamping force and the vertical stress on the cover, in the bolt and cover disposition illustrated in FIGS. 1–3.

The load applied by the stud 40 will be proportional to the vector component of the gasket normal force relative to the recess tapered surface. The stress on the vertical flange groove walls will be proportional to the horizontal vector of gasket force. FIG. 4 shows the effect of this concept to the bolt clamping force and the vertical stress on the cover, wherein $B_f = G_f \, SIN \, \emptyset$; $B_f$=Bolt Force; $G_f$=Gasket Normal Force; $\emptyset$=Groove Taper; $G_R$=Groove Wall Stiffness of Cover; $G_v \approx B_f$.

The sealing effect created is also such that the barrier 28 functions as designed to prevent liquid from passing therethrough and through the gasket 10. The loading between the barrier 22 and the inclined walls sufficiently reduces the permeability of the elastomer of the gasket in the zones between the barrier and the walls or surfaces of the recesses such that liquid will not pass therethrough as it would tend to do if the elastomer was insufficiently loaded.

The sealing arrangement provided in accordance with the present invention maintains the valve cover gasket under stress at all times at all locations along the length of the gasket, and minimizes the number of bolts normally required to provide an effective seal. This reduces hardware complexity.

The wedges and tapered recesses combine to create seals at upper and lower locations, thereby assuring an effective seal at both locations, unlike seals which use beads or the like at one or both flange surfaces to attempt to seal. The use of a pair of opposed wedge seals with complementary recesses requires a reduced bolt force to produce an effective seal, thus reducing the loading requirements, and tending to reduce the number of bolts needed to produce an effective seal. Further the wedge effect of the recess taper will tend to minimize the vertical stresses on the valve cover which would otherwise be required to provide an effective seal.

Because of the nature of the sealing arrangement, it is also be apparent that the stiffness of the cover and the cover flange will be less critical than it is in conventional sealing arrangements. Additionally, as has been pointed out, oil permeability which tends to be a problem with some elastomers, such as with some silicone elastomers, will be substantially reduced or eliminated. This is due to the increased loading in the locations where which liquid would need flow to bypass the barrier, as well as due to the increased length of the path which liquid must traverse to pass through the gasket elastomer from the zone under the cover to the outside of the cover.

It will be apparent to those skilled in the art that modifications may be made in the embodiment illustrated without departing from the spirit and scope of the invention. Accordingly, the invention is not intended to be limited, except as may be required by the appended claims.

What is claimed is:

1. A sealing assembly for sealing a pair of flanges together against the passage of liquid therepast, said sealing assembly comprising a continuous elastomeric gasket comprising a gasket body, said gasket body defining an integral first elastomeric wedge extending outwardly from said gasket body in a first direction and an integral second elastomeric wedge in line with said first wedge and extending outwardly from said gasket body in the opposite direction, each said wedge defining an inclined surface extending at an angle of at least about five degrees from its base, and a pair of flanges, one of said flanges defining a first recess complementary to said first wedge and the other of said flanges defining a second recess complementary to said second wedge, each of said recesses having an inclined surface extending at an angle of at least about five degrees from its base, and means for clamping said flanges and said gasket to force said wedge inclined surfaces into sealing engagement with said recess inclined surfaces, thereby to provide sealing contact between said wedges and said recesses only along said inclined surfaces.

2. A gasket assembly in accordance with claim 1 and wherein said gasket body embeds a continuous barrier strip, said continuous barrier strip extending into each of said first and second wedges to effect a seal internally of the gasket to prevent the flow of fluid through the gasket.

3. A gasket assembly in accordance with claim 1, and wherein said flanges comprise a valve cover flange and a head flange and said clamping means comprises a single clamping stud.

4. A gasket assembly in accordance with claim 1, and wherein each of said wedges and said recesses define pairs of complementary inclined surfaces.

5. A gasket assembly in accordance with claim 2, and wherein said continuous barrier strip is of plastic.

* * * * *